United States Patent
Anderson

(10) Patent No.: US 6,626,480 B2
(45) Date of Patent: Sep. 30, 2003

(54) TOOL BOX ANCHOR

(76) Inventor: Richard C. Anderson, 702 N. Main St., Bicknell, IN (US) 47512

( * ) Notice: Subject to any disclaimer, the term of this patent is extended or adjusted under 35 U.S.C. 154(b) by 0 days.

(21) Appl. No.: 10/265,938

(22) Filed: Nov. 18, 2002

(65) Prior Publication Data

US 2003/0067184 A1 Apr. 10, 2003

Related U.S. Application Data

(60) Provisional application No. 60/328,235, filed on Oct. 9, 2001.

(51) Int. Cl.$^7$ ................................................ B60N 3/12
(52) U.S. Cl. ...................... 296/37.6; 296/39.2; 224/404
(58) Field of Search .............................. 296/37.6, 39.2, 296/100.02, 43, 34, 50; 224/404, 541, 403, 281, 282, 543, 544, 275; 70/230; 43/61; 410/77, 96; 248/231–61

(56) References Cited

U.S. PATENT DOCUMENTS

| 4,085,961 A | * | 4/1978 | Brown ....................... 296/37.6 |
| 4,531,774 A | * | 7/1985 | Whatley ..................... 296/37.6 |
| 4,607,991 A | * | 8/1986 | Porter .......................... 296/43 |
| 4,769,942 A | * | 9/1988 | Copenhaver, Sr. ............. 43/61 |
| 4,779,434 A | * | 10/1988 | Derman ....................... 70/230 |
| 4,872,719 A | * | 10/1989 | Cardwell ..................... 296/34 |
| 4,967,944 A | * | 11/1990 | Waters ....................... 296/37.6 |
| 4,998,425 A | * | 3/1991 | Hoogland ................... 296/37.6 |
| 5,051,047 A | * | 9/1991 | Loncaric ....................... 410/77 |
| 5,052,737 A | * | 10/1991 | Farmer, Jr. .................. 296/39.2 |
| 5,169,200 A | * | 12/1992 | Pugh .......................... 296/37.6 |
| 5,427,425 A | * | 6/1995 | Droesch ....................... 296/50 |
| 5,560,576 A | * | 10/1996 | Cargill .................... 248/231.61 |
| 5,588,631 A | * | 12/1996 | Yee .............................. 224/404 |
| 5,779,117 A | * | 7/1998 | Rogers et al. ............... 224/404 |
| 5,848,818 A | * | 12/1998 | Flueckinger ................ 296/37.6 |
| 5,947,356 A | * | 9/1999 | Delong ....................... 296/37.6 |
| 6,082,804 A | * | 7/2000 | Schlachter .................. 296/37.6 |
| 6,354,647 B1 | * | 3/2002 | Voves ......................... 296/37.6 |
| 6,375,054 B1 | * | 4/2002 | Lance et al. ................ 296/37.6 |
| 6,481,604 B1 | * | 11/2002 | Beene et al. ................ 296/37.6 |
| 6,527,330 B1 | * | 3/2003 | Steffens et al. ......... 296/100.02 |
| 2001/0031185 A1 | * | 10/2001 | Swensen ....................... 410/96 |
| 2001/0054632 A1 | * | 12/2001 | Larsen et al. ................ 224/275 |
| 2002/0014505 A1 | * | 2/2002 | Lance et al. ................ 296/37.6 |
| 2002/0030373 A1 | * | 3/2002 | Brady ......................... 296/37.6 |

* cited by examiner

Primary Examiner—Kiran Patel
(74) Attorney, Agent, or Firm—Gary K. Price, Esq.

(57) ABSTRACT

A tool box anchor for releasably securing a tool box to the bed of a pickup truck, said tool box anchor including an elongated plate having a hollow plate extension, a support rod an L shape configuration, and having a first end and a second end. The tool box anchor further including a locking pin. When mounting the tool box to the bed of the pickup truck, the first end of the support rod is slidably inserted from inside the bed of the pickup truck in an upwardly direction through the plate extension, through a side wall clearance in the side wall of the pickup truck bed, and through a clearance in the tool box. In this position, the first end of the support rod vertically extends inside the tool box, and the second end of the support rod downwardly extends from the plate extension, within the bed of the pickup truck. Specifically, the support rod is positioned through the plate extension so that an angle in the support rod is approximately disposed at the lower end of the plate extension, with the second end of the support rod in substantially parallel relationship with the plate extension. The tool box is removably secured to the bed of the pickup truck by preferably slidably mounting a washer over the first end of the support rod and inserting the locking pin through an aperture disposed in the first end of the support rod.

8 Claims, 2 Drawing Sheets

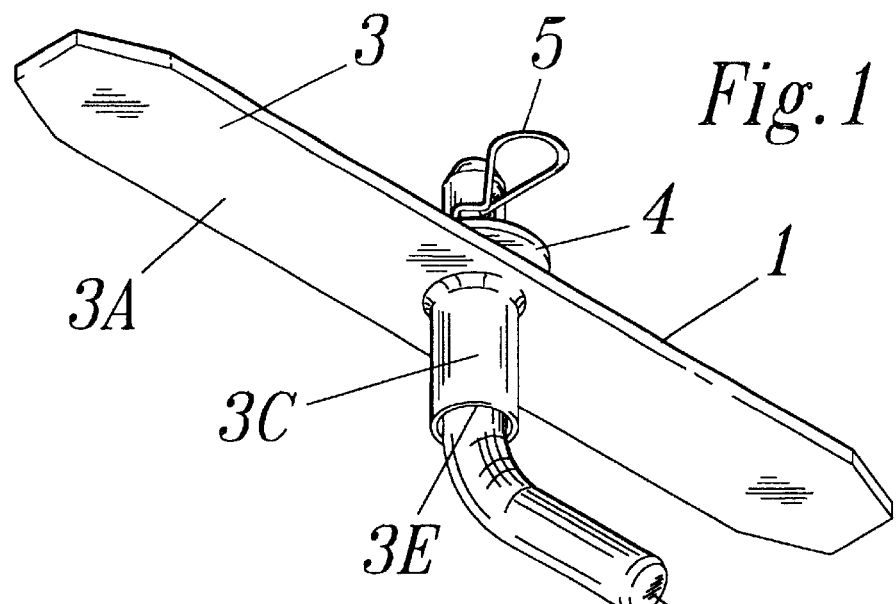
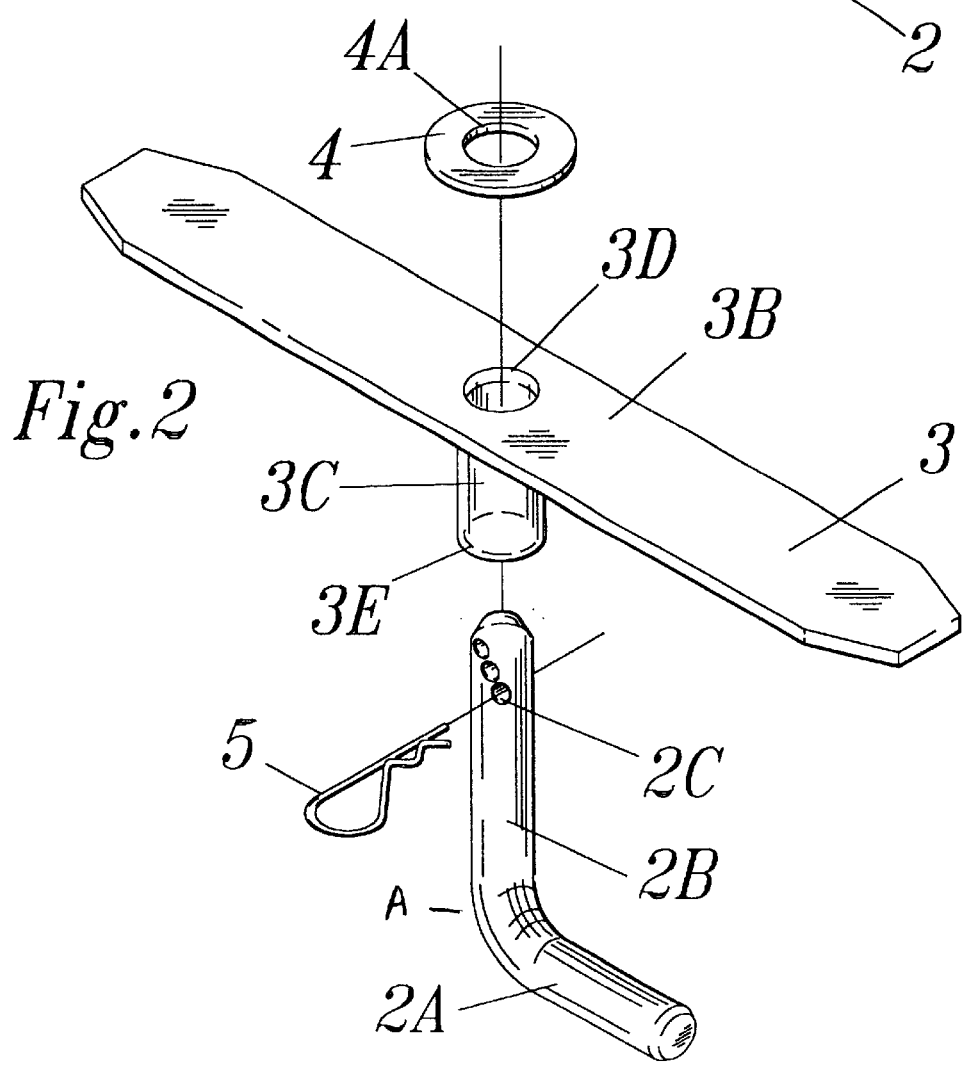

TOOL BOX ANCHOR

CROSS REFERENCES TO RELATED APPLICATIONS

U.S. Provisional Application for Patent No. 60/328,235, filed Oct. 9, 2001, with title "Tool Box Anchor For Pickup Trucks" which is hereby incorporated by reference. Applicant claims priority pursuant to 35 U.S.C. Par. 119(e)(i).

Statement as to rights to inventions made under Federally sponsored research and development:

Not Applicable

BACKGROUND OF THE INVENTION

1. Field of the Invention

This invention relates to attachment structures for vehicle accessories and more particularly to a tool box anchor for releasably securing a tool box or cargo box to the bed of a pickup truck.

2. Brief Description of Prior Art

Over the years many accessories have been developed for vehicles such as pickup trucks to give the owner versatility in the way that the owner may utilize the vehicle. For example, tool boxes or storage or cargo boxes have been designed for mounting in the bed of a pickup truck. Such tool boxes that have been developed require the owner to securely mount the accessory to the vehicle.

In response to such accessory, prior art methods for mounting tool boxes or cargo boxes is known in the art. Some tool boxes are permanently installed to the pickup bed. However, such permanently installed tool boxes limit the amount of cargo bed space available for transporting other cargo.

There also exists a number of disclosures for temporarily mounting tool boxes to the bed of the pickup truck. However, these prior art methods are relatively difficult and inconvenient for quick and easy installation and removal of the tool box, and therefore fail to achieve the same level of success as the present invention.

U.S. Pat. No. 5,052,737 to Farmer, Jr., discloses a clamping arrangement which allows a utility box which overlies the side rail of a truck to be clamped to the side walls of a truck box.

U.S. Pat. No. 4,728,017 to Mullican, discloses a C-clamp like device which clamps to the front wall of a truck box. A simple J-bolt may also be used to hook over the front rail of a truck box.

U.S. Pat. No. 4,249,684 to Miller, et al., discloses a tool box securable to a pair of parallel laterally spaced apart anchor rails attached to a flat horizontal mounting wall such as the floor of a truck bed, at a distance slightly less than spacing between lateral sides walls of the box, which has an upwardly recessed bottom wall to allow the box to fit over the anchor rails. An elongated arm pivotably mounted to the inner surface of each of the two lateral side walls of the box has fastener pins on the lower end of the arm that may be pivoted into a locking position in slots provided in the upper surface of the anchor rail.

U.S. Pat. No. 4,998,425 to Hoogland, discloses an arrangement to releasably secure each of the two doors of a utility carrier box mounted transversely behind the cab of a pickup truck and on the side walls of the pickup truck, the arrangement comprising staples secured to the end walls of the box below the hinges of the doors when the doors are in closed position, and a steep strap extending from below one staple over the top of the closed box and down to a point beyond the other staple, and in conformity with the surface of the closed box over which the strap means extends, each end of the strap being slotted to enable the length of the staple beyond which it extends to be passed through the slot and to receive the link of a padlock which is locked.

U.S. Pat. No. 5,169,200 to Pugh, discloses a pickup truck storage box for use in the cargo bed of a pickup truck. It has left and right edge brackets that receive left and right upstanding box panels; a center stake that fits between inner edges of the box panels to keep the outer edges of the box panel seated in the edge brackets; a channel member that fits over the upper edge of the truck bed's forward wall; a hinged, locking lid attached to the channel member; a hinged cross-member between the channel member and the upper, inner edges of the box panels; and cap strips that cover the top edges of the box panels.

What is needed is an anchor apparatus for mounting the tool box to the bed of the pickup truck that is relatively inexpensive to manufacture, and convenient for quick and easy installation and removal of the tool box from the bed of the pickup truck.

As will be seen from the subsequent description, the preferred embodiments of the present invention overcome these and other short comings of prior art.

SUMMARY OF THE INVENTION

The present invention is an apparatus that is a tool box anchor for pickup trucks for releasably securing a tool box to the bed of a pickup truck. Said apparatus of the present invention is convenient for quick and easy installation and removal of the tool box from the bed of the pickup truck. The tool box anchor includes an elongated plate having an upper surface, a lower surface, and an upper clearance, said upper clearance located in the approximate center of the elongated plate. Said elongated plate further including a plate extension downwardly extending from the lower surface of the elongated plate. Said plate extension includes a lower clearance which lower clearance of the plate extension is shaped and sized coincident with the upper clearance of the elongated plate. Said plate extension further having a bore therethrough that extends from the upper clearance to the lower clearance. Said tool anchor further including a support rod, said support rod including a tapered first end and a second end. Said support rod shaped to form an approximate 45 degree angle near the second end. The tapered first end of the support rod including at least one aperture that horizontally extends through the support rod, said at least one aperture designed to receive a locking pin.

In use, the lower base wall of the tool box rests on a top surface of side walls of the pickup truck bed. Said tool box having a tool box clearance up through the lower base wall of the tool box, and said top surface of the side walls having a side wall clearance. The tool box is releasably mounted to the top surface of each of the side walls of the pickup truck bed using the tool anchor of the present invention by positioning the upper clearance of the upper surface of the elongated plate in alignment with the side wall clearance of the side walls. The tapered first end of the support rod extends upwardly through the lower and upper clearances of the plate extension, up through the side wall clearance of the side wall of the pickup truck bed, up through the tool box clearance of the tool box, exposing the tapered first end inside the tool box. The tool box is removably secured to the top surface by preferably first slidably mounting a washer over the support rod, and inserting the locking pin through one of the apertures in the tapered first end of the support rod.

BRIEF DESCRIPTION OF THE DRAWINGS

FIG. 1 illustrates a perspective view of the assembled components of a preferred embodiment of the present invention, a tool box anchor for pickup trucks.

FIG. 2 illustrates an exploded view of the components of FIG. 1.

DESCRIPTION OF THE PREFERRED EMBODIMENTS

Figure 3:
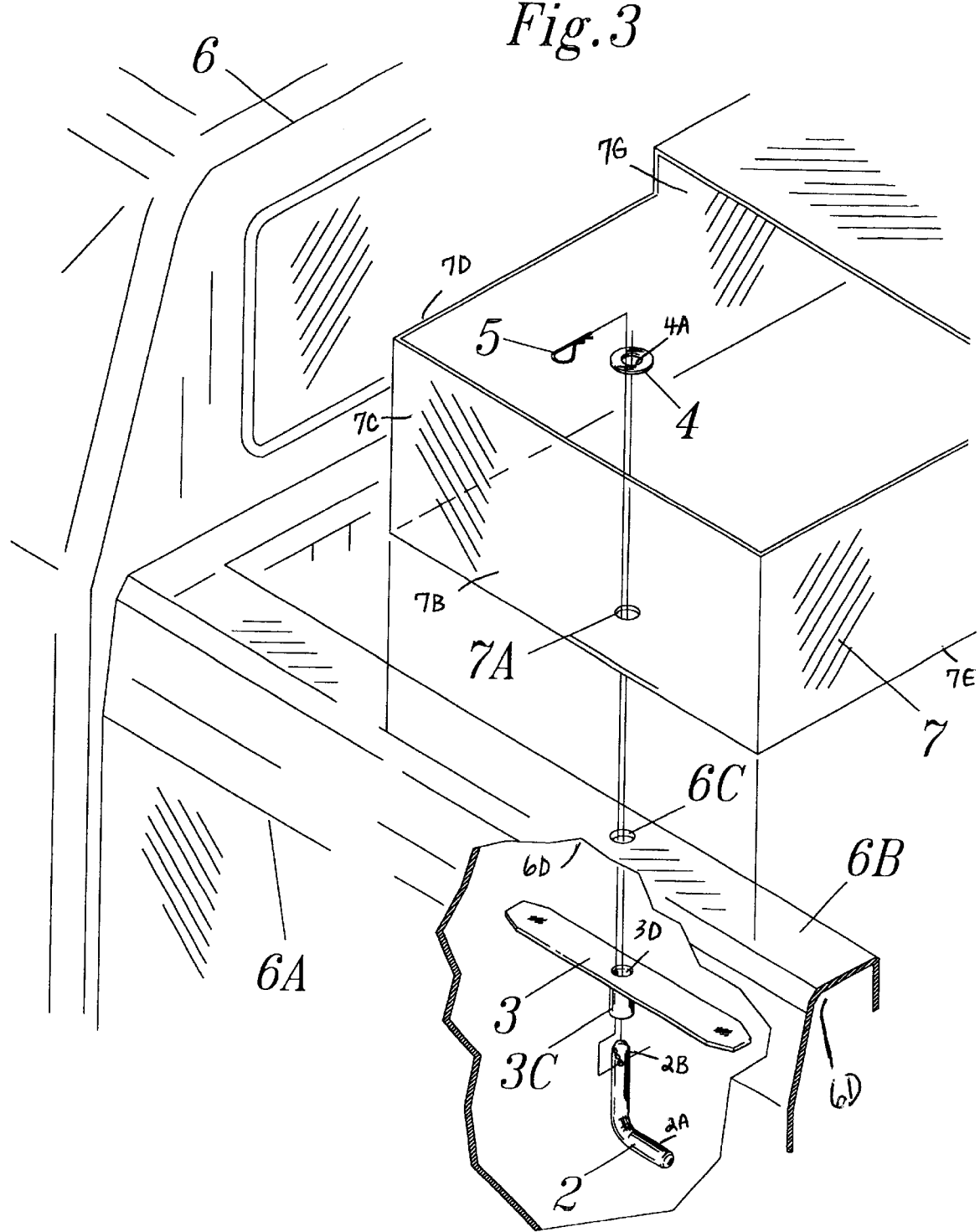
FIG. 3 illustrates an exploded sectional side view of the components of FIG. 1, mounted to a bed of a pickup truck.

FIGS. 1–3 illustrate a preferred embodiment of a tool box anchor 1 made in accordance with the present invention. The tool box anchor 1 is convenient for quick and easy installation and removal of a tool box from the bed of the pickup truck.

Specifically, it will be noted in the drawings that the tool box anchor 1 relates to a device for releasably securing tool box or cargo box to the bed of a pickup truck. In the broadest context, the device consists of components configured and correlated with respect to each other so as to attain the desired objective.

Referring to FIGS. 1 and 2, the tool box anchor 1 includes an elongated plate 3 having an upper surface 3B, a lower surface 3A, and an upper clearance 3D, said clearance 3D located in the approximate center of the elongated plate 3. Said elongated plate 3 further including a plate extension 3C downwardly extending from the lower surface 3A of the elongated plate 3. Said plate extension 3C includes a lower clearance 3E which lower clearance 3E of the plate extension 3C is shaped and sized coincident with the upper clearance 3D of the elongated plate 3. Said plate extension 3C further having a bore therethrough that extends from the upper clearance 3D to the lower clearance 3E.

Said tool box anchor 1 further including a support rod 2, said support rod 2 having a substantially L shape configuration, and further including a tapered first end 2B and a second end 2A. Said support rod 2 shaped to form an approximate 45 degree angle (designated as "A" in FIG. 2) near the second end 2A. The tapered first end 2B of the support rod 2 including at least one aperture 2C that horizontally extends through the support rod 2, said at least one aperture 2C designed to receive a locking pin 5. As best shown in FIG. 2, the tool box anchor 1 further including a washer 4 having a washer clearance 4A. As will be discussed the washer clearance 4A size and shaped to receive the tapered first end 2B of the support rod 2.

Referring to FIG. 3, a tool box 7 is shown with a bed of a pickup truck 6. The tool box 7 includes a substantially rectangular lower base wall 7B, and four retaining walls 7C, 7D, 7E and 7F (not shown), and a top wall 7G to define the tool box 7. The lower base wall 7B of the tool box 7 rests on a top surface 6B of an upright side wall 6A of a bed of the pickup truck 6. Said tool box 7 having a tool box clearance 7A up through the lower base wall 7B of the tool box 7, and said top surface 6B of the side wall 6A including a side wall clearance 6C. As shown in FIG. 3, said side wall clearance 6C extending from the top surface 6B of the side wall 6A downthrough the side wall 6A to a lower surface 6D of the side wall 6A.

The tool box 7 is releasably mounted to the top surface 6B of the side wall 6A of the pickup truck bed 6 using the tool box anchor 1. The tool box 7 is positioned at the desired location on the side walls 6A of the bed of the pickup truck 6. The tool box clearance 7A in the lower base wall 7B of the tool box 7 is aligned with the side wall clearance 6C of the top surface 6B of the side wall 6A of the pickup truck bed 6. From inside the bed of the pickup truck 6, the upper clearance 3D of the upper surface 3B of the elongated plate 3 is disposed in alignment with the side wall clearance 6C of the side wall 6A. In this position, the upper surface 3B is in abutting communication with the lower surface 6D of the side wall 6A. The tapered first end 2B of the support rod 2 is slidably inserted upwardly through the lower and upper clearances 3E and 3D, respectively, of the plate extension 3C, up through the side wall clearance 6C of the side wall 6A of the pickup truck bed 6, and up through the tool box clearance 7A of the tool box 7, exposing the tapered first end 2B inside the tool box 7. In this position, the first end 2B of the support rod 2 extending from the lower base wall 7B inside the tool box 7, and the second end 2A of the support rod 2 extending from the lower clearance 3E inside the bed of the pickup truck 6. Specifically, as best shown in FIG. 1, in application, the support rod 2 is positioned through the plate extension 3C as discussed above so that angle A of the support rod 2 is approximately disposed at the lower clearance 3E of the plate extension 3C, and the second end 2A of the support rod 2 is substantially parallel with the lower surface 3A of the elongated plate 3.

As shown in FIG. 3, the tool box 7 is removably secured to the top surface 6B of the side wall 6A by preferably first slidably mounting the washer 4 over the support rod 2, by inserting the tapered first end 2B through the washer clearance 4A of the washer 4, and then inserting the locking pin 5 through one of the apertures 2C in the tapered first end 2B of the support rod 2. Locking pin 5 is configured to be positioned in one of the apertures 2C and substantially secure the support rod 2 within the elongated plate 3 coupled to the tool box 7 and the side wall 6A of the bed of the pickup truck 6.

To remove the tool box 7 from the bed of the pickup truck 6, remove the locking pin 5 from one of the apertures 2C of the support rod 2 inside the tool box 7 as described above, thereby releasing the support rod 2 and allowing the support rod 2 to be slidably removed from the plate extension 3C of the elongated plate 3. Specifically, once the locking pin 5 is removed from the aperture 2C as described above, the support rod 2 may be urged downwardly from the inside the bed of the pickup truck 6 thereby releasing the support rod 2 from the plate extension 3C of the elongated plate 3. Once the support rod 2 is removed, the elongated plate 3 is further disengaged, likewise causing the tool box 7 to be released.

The method of attaching the tool box 7 to the bed of the pickup truck 6 is best shown in FIG. 3. The tool box 7 is positioned at the desired location on the side walls 6A of the bed of the pickup truck 6. The tool box clearance 7A in the lower base wall 7B of the tool box 7 is aligned with the side wall clearance 6C of the top surface 6B of the side wall 6A of the pickup truck bed 6. The elongated plate 3 is positioned with the lower surface 6D of the side wall 6A so that the upper surface 3B of the elongated plate 3 is in abutting communication with the lower surface 6D of the side wall 6A, and so that the upper clearance 3D of the elongated plate 3 is in alignment with the side wall and tool box clearances 6C and 7A, of the top surface 6B and tool box 7, respectively.

From inside the bed of the pickup truck 6, the tapered first end 2B of the support rod 2 is slidably inserted up through the lower and upper clearances 3E and 3D, respectively, of the plate extension 3C, up through the side wall clearance 6C of the side wall 6A of the pickup truck bed 6, and up through the tool box clearance 7A of the lower base wall 7B of the tool box 7. In this position, the first end 2B of the support rod 2 vertically extends from the tool box clearance 7A inside the tool box 7, and the second end 2A extends from lower clearance 3E of the plate extension 3C inside the bed of the pickup truck 6. Specifically, as best shown in FIG. 1, the support rod 2 is positioned through the plate extension 3C as discussed above so that angle A of the support rod 2 is approximately disposed at the lower clearance 3E of the plate extension 3C, and the second end 2A of the support rod 2 is substantially parallel with the lower surface 3A of the elongated plate 3.

The tool box 7 is removably secured to the top surface 6B of the bed of the pickup truck 6 by preferably first slidably mounting the washer 4 over the first end 2B of the support rod 2, by inserting the tapered first end 2B through the washer clearance 4A of the washer 4, and then inserting the locking pin 5 through one of the apertures 2C in the tapered first end 2B of the support rod 2.

As should be appreciated, the bed of the pickup truck 6 actually includes a pair of upright side walls 6A disposed in parallel relationship on opposite sides of the pickup truck bed 6. The tool box 7 is mounted to the bed of the pickup truck 6 applying the tool box anchor 1 to each side wall 6A as described above. As such, while only the application of mounting one side of the tool box 7 to the side wall 6A using the tool box anchor 1 is primarily discussed and shown in the drawings, it should be understood that application of the tool box anchor 1 to the opposite side wall 6A is identical to that described.

Use of the tool box anchor 1 of the present invention provides several advantages to the user, including the elimination of lateral and longitudinal movement of the tool box 7, and ease of installing and removing the tool box 7 from the pickup bed 6. Further, the present invention allows the user to install the tool box 7 at multiple locations along the top surface 6B of the side walls 6A of the pickup bed 6.

Although the description above contains many specificities, these should not be construed as limiting the scope of the invention but as merely providing illustrations of some of the presently preferred embodiments of this invention.

Thus the scope of the invention should be determined by the appended claims in the formal application and their legal equivalents, rather than by the examples given.

I claim:

1. A tool box anchor for securing a tool box to the bed of a pickup truck, the bed of the pickup truck having upright side walls disposed in parallel relationship on opposite sides of the pickup truck bed, each of the side walls having a top surface with a pre-drilled side wall clearance, said side wall clearance is coincident with a pre-drilled tool box clearance disposed through a lower base wall in the tool box, said tool box anchor comprising:
    an elongated plate having an upper surface, a lower surface, an upper clearance disposed through the upper surface, and a plate extension downwardly extending from the lower surface, said plate extension including a lower clearance shaped and sized coincident with the upper clearance, and further having a bore therethrough that extends from the upper clearance to the lower clearance,
    a support rod having a tapered first end and a second end, the first end including at least one aperture that horizontally extends through the support rod, and
    a locking pin,
    wherein the tapered first end of the support rod upwardly extends through the lower clearance of the plate extension, through the upper clearance of the elongated plate, through the side wall clearance, and vertically extends through the tool box clearance, inside the tool box,
    wherein the locking pin is configured to be inserted in the aperture and releasably secures the support rod within the elongated plate coupled to the tool box and the side wall of the bed of the pickup truck, thereby releasably securing the tool box to the bed of the pickup truck.

2. The tool box anchor as recited in claim 1, wherein the support rod having a substantially L shape configuration to form an approximate 45 degree angle near the second end.

3. The tool box anchor as recited in claim 2, wherein the support rod is configured to engage said elongated plate and adapted to couple the tool box to the bed of the pickup truck.

4. A tool box anchor for securing a tool box to the bed of a pickup truck, the bed of the pickup truck having upright side walls, each of the side walls having a top surface with a pre-drilled side wall clearance, said side wall clearance being coincident with a pre-drilled tool box clearance disposed through a lower base wall of the tool box, the tool box anchor comprising:
    an elongated plate having a lower surface, and a hollow plate extension downwardly extending from the lower surface,
    a support rod having a first end and a second end, the first end including at least one aperture, and
    a locking pin,
    wherein the first end of the support rod extends through the hollow plate extension, through the side wall clearance, and through the tool box clearance, inside the tool box,
    wherein the locking pin is configured to be inserted in the aperture and releasably secures the support rod within the elongated plate coupled to the tool box and the bed of the pickup truck.

5. The tool box anchor as recited in claim 4, wherein the support rod having a substantially L shape configuration to form an approximate 45 degree angle near the second end.

6. A method for mounting a tool box to the bed of a pickup truck, the bed of the pickup truck having upright side walls disposed in parallel relationship on opposite sides of the pickup truck bed, each of the side walls having a top surface and a lower surface, and a pre-drilled side wall clearance extending from the upper surface to the lower surface, said side wall clearance in coincident with a pre-drilled tool box clearance disposed through a lower base wall of the tool box, comprising the steps of:
    positioning the tool box at a location on the top surface of the side walls of the bed of the pickup truck,
    aligning the tool box clearance of the tool box with the side wall clearance of the side wall of the pickup truck bed,
    positioning an elongated plate having an upper surface in abutting relationship with the lower surface of the side wall of the bed of the pickup truck so that an upper clearance disposed through the upper surface of the elongated plate is in alignment with the side wall clearance and tool box clearance, said elongated plate further including a lower surface and a plate extension downwardly extending from the lower surface of the elongated plate, said plate extension including a lower clearance shaped and sized coincident with the upper clearance of the elongated plate, and further having a bore therethrough that extends from the upper clearance to the lower clearance,
    slidingly inserting a first end of a support rod upwardly through the lower and upper clearances of the plate extension, through the side wall clearance of the side wall of the pickup truck bed, and up through the tool box clearance of the lower base wall of the tool box, said support rod further including a second end and at least one aperture disposed through the first end, positioning the support rod so that the first end of the support rod vertically extends through the tool box clearance, inside the tool box, and the second end of the support rod downwardly extends from the lower clearance of the plate extension, inserting a locking pin in the aperture of the first end of the support rod.

7. The method as recited in claim 6, wherein the support rod having a substantially L shape configuration to form an approximate 45 degree angle near the second end.

8. The method as recited in claim 7, wherein the support rod is configured to engage said elongated plate and adapted to couple the tool box to the bed of the pickup truck.

\* \* \* \* \*